(12) United States Patent
Zhou et al.

(10) Patent No.: US 9,796,559 B2
(45) Date of Patent: Oct. 24, 2017

(54) CAGE ENERGY SUPPLY SYSTEM AND CONTROL METHOD THEREFOR

(71) Applicant: CHINA UNIVERSITY OF MINING AND TECHNOLOGY, Jiangsu (CN)

(72) Inventors: Gongbo Zhou, Jiangsu (CN); Zhencai Zhu, Jiangsu (CN); Penghui Wang, Jiangsu (CN); Peng Zhang, Jaingsu (CN); Wei Li, Jiangsu (CN); Guohua Cao, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 15/116,818

(22) PCT Filed: Jun. 17, 2015

(86) PCT No.: PCT/CN2015/081599
§ 371 (c)(1),
(2) Date: Aug. 4, 2016

(87) PCT Pub. No.: WO2016/054930
PCT Pub. Date: Apr. 14, 2016

(65) Prior Publication Data
US 2017/0210593 A1    Jul. 27, 2017

(30) Foreign Application Priority Data
Oct. 9, 2014   (CN) .......................... 2014 1 0529885

(51) Int. Cl.
*B66B 1/06*     (2006.01)
*F03D 9/22*     (2016.01)
(Continued)

(52) U.S. Cl.
CPC ............. *B66B 1/06* (2013.01); *B66B 15/08* (2013.01); *B66B 17/04* (2013.01); *F03D 9/11* (2016.05);
(Continued)

(58) Field of Classification Search
CPC   B66B 1/06; B66B 15/08; B66B 17/04; F03D 9/11
(Continued)

(56) References Cited

U.S. PATENT DOCUMENTS 7,770,331 B2 *   8/2010  Halloran .................. F03B 13/06
                                                    187/272
2002/0112924 A1 *  8/2002  Mori ......................... B66B 1/30
                                                    187/290
(Continued)

FOREIGN PATENT DOCUMENTS

CN    203319455 U    12/2013
CN    103569832 A    2/2014
(Continued)

OTHER PUBLICATIONS

International Search Report dated Sep. 23, 2015 from International Patent Application No. PCT/CN2015/081599, filed Jun. 17, 2015.

*Primary Examiner* — David Warren
(74) *Attorney, Agent, or Firm* — Sunstone IP

(57) ABSTRACT

A cage energy supply system comprises wind power generation devices, a tail rope beam suspension device and a control device that are connected to the bottom of a cage box. The tail rope beam suspension device and the control device are located on the central axis of the bottom of the cage box, and the two sides of the tail rope beam suspension device are each connected to one wind power generation device. By means of the characteristics that the descending speed of the cage is high and the relative wind speed of an
(Continued)

auxiliary shaft is high, the two wind power generation devices charge one storage battery at the same time, and the two storage batteries carry out charging and power supply alternately, so that a powered unit of the cage is supported by a stable and reliable power source all the time, the power supply requirement of the cage for the powered unit thereof is met, and meanwhile the power supply requirement for the control device is met. The devices are simple in structure and only need to be overhauled and maintained regularly. The present invention also relates to a control method for the cage energy supply system.

3 Claims, 3 Drawing Sheets

(51) Int. Cl.
    *F03D 9/11*     (2016.01)
    *F03D 15/00*     (2016.01)
    *B66B 15/08*     (2006.01)
    *B66B 17/04*     (2006.01)
    *H02J 7/00*     (2006.01)

(52) U.S. Cl.
    CPC ............... *F03D 9/22* (2016.05); *F03D 15/00* (2016.05); *H02J 7/0072* (2013.01)

(58) Field of Classification Search
    USPC ......................................................... 187/290
    See application file for complete search history.

(56) References Cited

U.S. PATENT DOCUMENTS

| | | | |
|---|---|---|---|
| 2010/0012437 A1 | 1/2010 | Smith | |
| 2013/0223964 A1* | 8/2013 | Zheng | E04H 12/34 414/560 |
| 2014/0130420 A1* | 5/2014 | Talonen | B66B 9/00 52/30 |
| 2014/0166407 A1* | 6/2014 | Sonnenmoser | B66B 1/2408 187/276 |
| 2016/0083220 A1* | 3/2016 | Agirman | H02J 7/02 187/290 |
| 2016/0276881 A1* | 9/2016 | Takahashi | H02K 1/148 |
| 2017/0210593 A1* | 7/2017 | Zhou | B66B 1/06 |

FOREIGN PATENT DOCUMENTS

| | | | | |
|---|---|---|---|---|
| CN | 104444644 A | | 3/2015 | |
| CN | WO 2016150048 A1 * | | 9/2016 | ............... B66B 5/02 |
| JP | 07215603 A | | 8/1995 | |

* cited by examiner

CAGE ENERGY SUPPLY SYSTEM AND CONTROL METHOD THEREFOR

FIELD OF THE INVENTION

The invention relates to an energy supply system and control method for a lifting apparatus, and specifically to a cage energy supply system and control method thereof.

BACKGROUND OF THE INVENTION

Cage is the primary equipment for carriers in a mine well. The bottom of the cage is connected with a tail rope beam suspension device. In the recent years, With the increase in security awareness and the continuously improvement of the automation level of the mine, the interior of the cage is equipped with some low voltage power devices, such as illumination lamps, electric cage curtain doors, secure communication devices and the like. Such apparatuses have to be supported by the stable and reliable power source to normally operate. In the prior art, one storage battery is employed to supply power; after the battery runs out, it must be removed for charging and replaced with a fully charged storage battery, or it is charged by utilizing a charging system disposed at a wellhead. This not only wastes human power, but also has long charging time and is likely to delay the normal operation of the lifting apparatus.

SUMMARY OF THE INVENTION

In order to overcome the disadvantages in the prior art, the invention provides a cage energy supply system and control method thereof with stable and reliable system, high safety and high automation degree, which solves the problem of power consumption automation of the lifting cage in the mine well.

The technical solution to achieve the above-mentioned objective of the invention is that: the energy supply system comprises a tail rope beam suspension device connected to the bottom of a cage; the energy supply system further comprises wind power generation devices and a control device; wind power generation devices, the tail rope beam suspension device and a control device are all connected to the bottom of a cage box, the tail rope beam suspension device and the control device are located on the central axis of the bottom of the cage box, and the two sides of the tail rope beam suspension device are each connected with one wind power generation device.

The wind power generation device further comprises a pneumatic part, a power generation part and a power storage part; the pneumatic part comprises a blade, a hub, a bevel gear shaft, a rotor bearing, a bearing bracket and a fixed plate; the blade is connected to the bevel gear shaft through the hub; the bevel gear shaft is in a clearance fit with the rotor bearing bracket; the bearing bracket is connected to the fixed plate through a bolt; the fixed plate is riveted to the bottom of the cage.

A distance from a plane of rotation of the blade to the bottom of the cage box is a feature distance L, the distance range of the feature distance L is [0.6 m, 1.0 m].

The power generation part comprises a low-speed bevel gear shaft, a pedestal bearing, a low-speed coupling, a gearbox, a high-speed shaft, a high-speed coupling, an electric generator and a fixed case body; the gearbox comprises a pair of meshing gears; the gear of the low-speed bevel gear shaft is engaged with that of the bevel gear shaft of a wind machine part of the device; the low-speed bevel gear shaft is connected with a gearbox input shaft through the low-speed coupling; a gearbox output shaft is connected with the high-speed shaft through the high-speed coupling; the high-speed shaft is connected with an input shaft of a rotor winding of the electric generator through the high-speed coupling.

The power storage part comprises a storage battery that is connected with an external control system through charging and power supply interfaces.

The control device comprises an electric energy input interface in parallel, an input current sampling circuit, a current-to-voltage converter, a main controller, MOS switching circuits, a first storage battery charging interface, a first storage battery power supply interface, a second storage battery charging interface, a second storage battery power supply interface and a power supply output interface; the electric energy input interface in parallel is the one that inputs the electric energy to the storage battery after output electric energy lines of two wind driven generators are connected in parallel; an input end of the input current sampling circuit is connected with the storage battery charging interfaces and an output end is connected with an input end of the current-to-voltage converter; an output end of the current-to-voltage converter transmits a signal to the main controller; an output end of the main controller is connected with a grid of the MOS switching circuit; an MOS switching circuit (IA) is disposed between the electric energy input end in parallel and the first storage battery charging interface; an MOS switching circuit (IB) is disposed between the electric energy input end in parallel and the second storage battery charging interface; an MOS switching circuit (OA) is disposed between the first storage battery power supply interface and the power supply output interface; an MOS switching circuit (OB) is disposed between the second storage battery power supply interface and the power supply output interface; the power supply output interface is connected with an external voltage reducing and increasing apparatus to supply power for a cage illumination system and a driving motor of a power-driven cage curtain door.

The control method of the energy supply system is as follows:

(1) when the wind power generation devices and the control system are in an operating state that the first storage battery is charged and the second storage battery supplies power, the MOS switching circuit (IA) is in a turn-on state, the MOS switching circuit (IB) is in a cutoff state, meanwhile, the MOS switching circuit (OB) is in a turn-on state, the MOS switching circuit (OA) is in a cutoff state; instead, the turn-on and cutoff states of each MOS switching circuit are opposite;

(2) the input end of the current sampling circuit samples a charging current of the first storage battery at intervals of set value time t1; the sampled current signal is converted into a voltage signal through the current-to-voltage converter and is transmitted to the main controller for analysis and judgment; the voltage signal is compared with a set value U that is a converted voltage value corresponding to a current value when the storage battery is saturated;

(3) if the voltage value is less than the set value, the storage battery is saturated with charging, the main controller enters an interruption and carries out timekeeping to send signals to the MOS switching circuits such that the MOS switching circuit (OA) turns on, the MOS switching circuit (IB) turns on, the MOS switching circuit (IA) is cutoff, meanwhile, timekeeping is started, and the timekeeping is a certain set value time t2, in order not to affect the normal operation of the power device for the cage due to the conversion between turn-on and cutoff states of the MOS switching circuit; after reaching the timekeeping time, the main controller sends a signal to enable a cutoff of the MOS switching circuit (OB).

Benefits: Since the above-mentioned solution is used, the wind power generation system at the bottom of a cage and control method thereof provided by the invention lie in that: the characteristics that the descending speed of the cage is high, and the relative wind speed of an auxiliary shaft is high are utilized; the requirement of the cage for supplying power to the power device is achieved in combination with the wind power generation principle, and meanwhile the power supply requirement of the control device is met; the device is simple in structure, safe and reliable, and only needs to be overhauled and maintained at regular intervals so as to achieve the automation requirement of the internal power supply for the lifting apparatus; two wind power generation devices charge one storage battery at the same time by the signal collection and judgment processing of the control device, the two storage batteries carry out alternative charging and power supply, so that a power device for the cage is supported by the stable and reliable power source all the time, thereby completely solving the problem of the power consumption automation of the lifting cage in the mine well.

The advantages of the invention are that: the wind power generation device mounted at the bottom of the cage is capable of realizing power generation by itself and charging the storage battery; the control device is capable of realizing the automatic switching between charging and power supply of the storage battery, and the system is stable, reliable and high in safety and automation degree.

Figure 1:
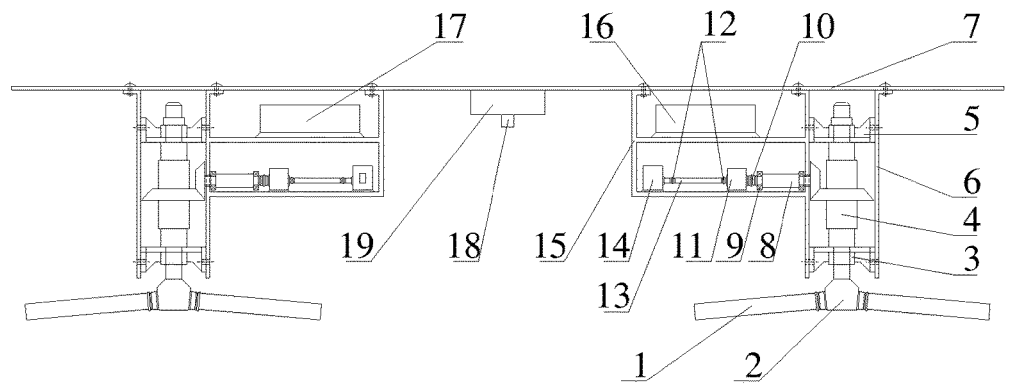
FIG. 1 is a structural schematic diagram of a wind power generation device at the bottom of a cage of the invention.

In the drawings, 1, a blade; 2, a hub; 3, a rotor bearing; 4, a bevel gear shaft; 5, a bearing bracket; 6, a fixed plate; 7, the bottom of a cage box; 8, a low-speed bevel gear shaft; 9, a pedestal bearing; 10, a low-speed coupling; 11, a gearbox; 12, a high-speed coupling; 13, a high-speed shaft; 14, an electric generator; 15, a fixed case body; 16, a first storage battery; 17, a second storage battery; 18, a tail rope beam suspension device; 19, a control device.

DETAILED DESCRIPTION OF THE EMBODIMENTS

One embodiment of the invention is further described in connection with the accompanying drawings:

The energy supply system of the invention comprises a tail rope beam suspension device connected to the bottom of a cage; the energy supply system further comprises wind power generation devices and a control device; the wind power generation devices, the tail rope beam suspension device and the control device are all connected to the bottom of a cage box, the tail rope beam suspension device and the control device are located on the central axis of the bottom of the cage box, and two sides of the tail rope beam suspension device are each connected with one wind power generation device.

The wind power generation device further comprises a pneumatic part, a power generation part and a power storage part; the pneumatic part comprises a blade, a hub, a bevel gear shaft, a rotor bearing, a bearing bracket and a fixed plate; the blade is connected to the bevel gear shaft through the hub; the bevel gear shaft is in a clearance fit with the rotor bearing bracket; the bearing bracket is connected to the fixed plate through a bolt; the fixed plate is riveted to the bottom of the cage.

A distance from a plane of rotation of the blade to the bottom of the cage box is a feature distance L, the distance range of the feature distance L is [0.6 m, 1.0 m].

The power generation part comprises a low-speed bevel gear shaft, a pedestal bearing, a low-speed coupling, a gearbox, a high-speed shaft, a high-speed coupling, an electric generator and a fixed case body; the gearbox comprises a pair of meshing gears; the gear of the low-speed bevel gear shaft is engaged with that of the bevel gear shaft of a wind machine part of the device; the low-speed bevel gear shaft is connected with a gearbox input shaft through the low-speed coupling; a gearbox output shaft is connected with the high-speed shaft through the high-speed coupling; the high-speed shaft is connected with an input shaft of a rotor winding of the electric generator through the high-speed coupling.

The power storage part comprises a storage battery that is connected with an external control device through charging and power supply interfaces.

The control device comprises an electric energy input interface in parallel, an input current sampling circuit, a current-to-voltage converter, a main controller, MOS switching circuits, a first storage battery charging interface, a first storage battery power supply interface, a second storage battery charging interface, a second storage battery power supply interface and a power supply output interface; the electric energy input interface in parallel is the one that inputs the electric energy to the storage battery after output electric energy lines of two wind driven generators are connected in parallel; an input end of the input current sampling circuit is connected with the storage battery charging interfaces and an output end is connected with an input end of the current-to-voltage converter; an output end of the current-to-voltage converter transmits a signal to the main controller; an output end of the main controller is connected with a grid of the MOS switching circuit; an MOS switching circuit (IA) is disposed between the electric energy input end in parallel and the first storage battery charging interface; an MOS switching circuit (IB) is disposed between the electric energy input end in parallel and the second storage battery charging interface; an MOS switching circuit (OA) is disposed between the first storage battery power supply interface and the power supply output interface; an MOS switching circuit (OB) is disposed between the second storage battery power supply interface and the power supply output interface; the power supply output interface is connected with an external voltage reducing and increasing apparatus to supply power for a cage illumination system and a driving motor of a power-driven cage curtain door.

The control method of the energy supply system is as follows:

(1) when the wind power generation devices and the control system are in an operating state that the first storage battery is charged and the second storage battery supplies power, the MOS switching circuit (IA) is in a turn-on state, the MOS switching circuit (IB) is in a cutoff state, meanwhile, the MOS switching circuit (OB) is in a turn-on state, the MOS switching circuit (OA) is in a cutoff state; instead, the turn-on and cutoff states of each MOS switching circuit are opposite;

(2) the input end of the current sampling circuit samples a charging current of the first storage battery at regular intervals which are set values t1 depending on the actual lifting condition; the sampled current signal is converted into a voltage signal through the current-to-voltage converter and is transmitted to the main controller for analysis and judgment; the voltage signal is compared with a set value U that is a converted voltage value corresponding to a current value when the storage battery is saturated;

(3) if the voltage value is less than the set value, the storage battery is saturated with charging, the main controller enters an interruption and carries out timekeeping to send signals to the MOS switching circuits such that the MOS switching circuit (OA) turns on, the MOS switching circuit (IB) turns on, the MOS switching circuit (IA) is cutoff, meanwhile timekeeping is started, and the timekeeping is a certain set time value t2, in order not to affect the normal operation of the power device for the cage due to the conversion between turn-on and cutoff states of the MOS switching circuit; after reaching the timekeeping time, the main controller sends a signal to enable a cutoff of the MOS switching circuit (OB).

Figure 2:
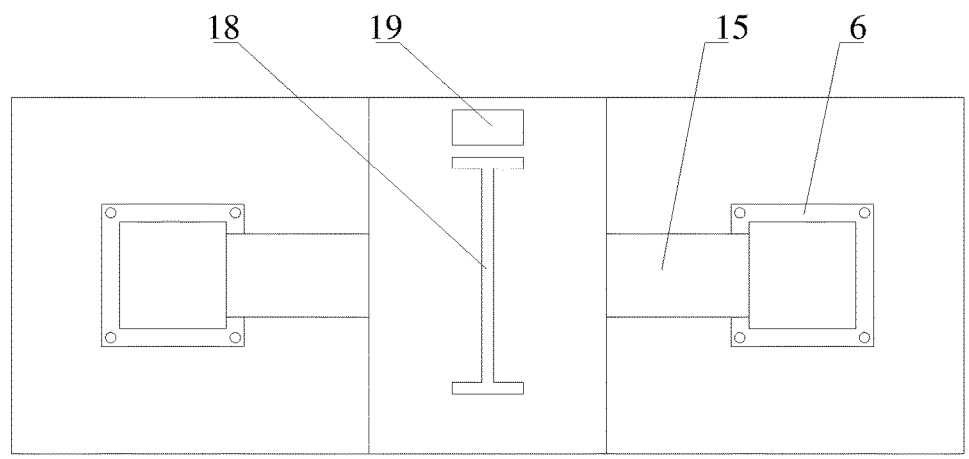
FIG. 2 is a schematic diagram of the arrangement of each device at the bottom of a cage of the invention.

Embodiment: referring to FIGS. 1 and 2, the wind power generation device at the bottom of the cage of the invention is integrally fixed to the bottom 7 of a cage box in structure; left and right sides thereof are symmetric relative to a tail rope beam suspension device 18; a pair of cages of the auxiliary shaft in the mine well are driven by a lifting mechanism to ascend and descend respectively; when the cage descends, it is quickly accelerated to a stable speed, i.e., a rated wind speed of a wind driven generator; a blade 1 is a twisted blade; the installation angles at the blade wings are different; an installation angle at the radius $r_i$ along the wingspan direction is $\theta_i$; the blade rotating directions of two wind driven generators are opposite under the action of the wind force to maintain the reliability and stability of the cage device; at the same time, a distance from the blade 1 to the bottom 7 of the cage box is a feature distance L which ensures that a sufficient fluid space can be formed between upper and lower ends of the blade. The blade 1 drives a bevel gear shaft 4 to rotate through a hub 2; the bevel gear shaft 4 is fixed below the bottom 7 of the cage box in a vertical direction through a rotor bearing 3, a bearing bracket 5 and a fixed plate 6.

A plane of rotation of the blade 1 to the bottom 7 of cage box is a feature distance L, the distance range of the feature distance L is [0.6 m, 1.0 m].

A low-speed bevel gear shaft 8 is engaged with the bevel gear shaft 4 for rotation. The other end of the low-speed bevel gear shaft 8 is connected with an input shaft of a gearbox 11 through a low-speed coupling 10; the meshing gears in the gearbox 11 act to increase the rotating speed; an output shaft of the gearbox 11 is connected with a high-speed shaft 13 through a high-speed coupling 12; the other end of the high-speed shaft 13 is connected with an input shaft of an electric generator through the high-speed coupling 12 to drive a rotor winding to rotate, thereby creating an inductive electromotive force and outputting electric energy.

Figure 3:
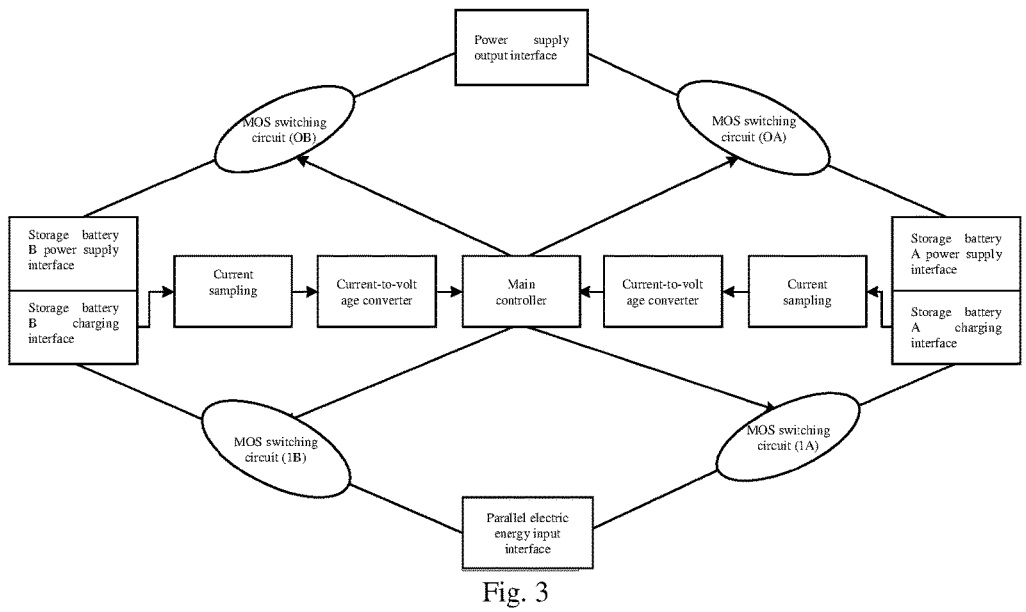
FIG. 3 is a schematic diagram of a control principle of a control device of the invention.
Figure 4:
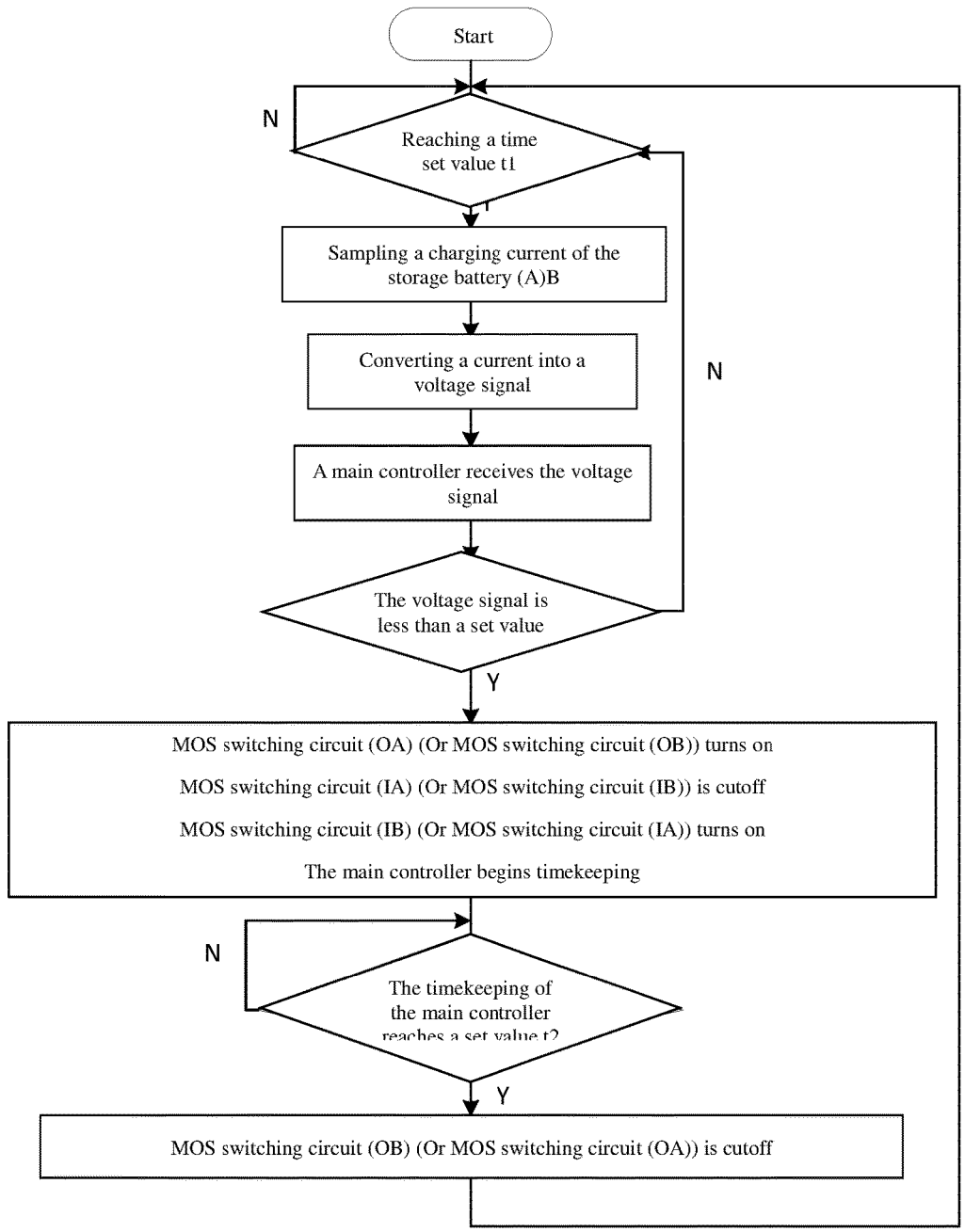
FIG. 4 is a control flow diagram of a control device of the invention.

Referring to FIGS. 2, 3 and 4, a control device 19 is installed below the bottom 7 of cage box at a front end (or tail end) of the tail rope beam suspension device 18 in the middle position and is in the same central axis as the tail rope beam suspension device 18.

During the normal charging and power supply process, if a first storage battery is in a charging state and an MOS switching circuit (IA) turns on, a second storage battery is in a power supply state, which is to say, an MOS switching circuit (OB) turns on, an MOS switching circuit (OA) is cutoff, and an MOS switching circuit (IB) is cutoff. A current sampling module samples a charging current of the first storage battery at intervals of set value time t1, passes through a current-to-voltage converter, a voltage signal is transmitted to a main controller; the main controller carries out comparison and analysis with the set value; when the voltage signal is less than the set value, it is indicated that the first storage battery is saturated with charging; the main controller sends a signal to enable the turn-on of the MOS switching circuit (OA), the cutoff of the MOS switching circuit (IA), the turn-on of the MOS switching circuit (IB) and it begins timekeeping; when the timekeeping reaches the set value, the main controller sends a signal to enable the MOS switching circuit (OB) to be cutoff; the switching among all of the charging and power supply functions is completed and it circulates sequentially.

The invention claimed is:

1. A cage energy supply system comprising a cage and a tail rope beam suspension device, wherein the energy supply system further comprises wind power generation devices and a control device; the wind power generation devices, the tail rope beam suspension device and the control device are all connected to the bottom of a cage box; the tail rope beam suspension device and the control device are located on the central axis of the bottom of the cage box, and two sides of the tail rope beam suspension device are each connected with one wind power generation device;

the wind power generation device further comprises a pneumatic part, a power generation part and a power storage part; the pneumatic part comprises a blade, a hub, a bevel gear shaft, a rotor bearing, a bearing bracket and a fixed plate; the blade is connected to the bevel gear shaft through the hub; the bevel gear shaft is in a clearance fit with the rotor bearing bracket; the bearing bracket is connected to the fixed plate through a bolt; the fixed plate is riveted to the bottom of the cage;

the power generation part comprises a low-speed bevel gear shaft, a pedestal bearing, a low-speed coupling, a gearbox, a high-speed shaft, a high-speed coupling, an electric generator and a fixed case body; the gearbox comprises a pair of meshing gears; the gear of the low-speed bevel gear shaft is engaged with that of the bevel gear shaft of a wind machine part of the device; the low-speed bevel gear shaft is connected with a gearbox input shaft through the low-speed coupling; a gearbox output shaft is connected with the high-speed shaft through the high-speed coupling; the high-speed shaft is connected with an input shaft of a rotor winding of the electric generator through the high-speed coupling;

the power storage part comprises a storage battery that is connected with an external control system through charging and power supply interfaces;

the control device comprises an electric energy input interface in parallel, an input current sampling circuit, a current-to-voltage converter, a main controller, MOS switching circuits, a first storage battery charging interface, a first storage battery power supply interface, a second storage battery charging interface, a second storage battery power supply interface and a power supply output interface; the electric energy input interface in parallel is the one that inputs the electric energy to the storage battery after the output electric energy lines of two wind driven generators are connected in parallel; an input end of the input current sampling circuit is connected with the storage battery charging interfaces and an output end is connected with an input end of the current-to-voltage converter; an output end of the current-to-voltage converter transmits a signal to the main controller; an output end of the main controller is connected with a grid of the MOS switching circuit; an MOS switching circuit (IA) is disposed between the electric energy input end in parallel and the first storage battery charging interface; an MOS switching circuit (IB) is disposed between the electric energy input end in parallel and the second storage battery charging interface; an MOS switching circuit (OA) is disposed between the first storage battery power supply interface and the power supply output interface; an MOS switching circuit (OB) is disposed between the second storage battery power supply interface and the power supply output interface; the power supply output interface is connected with an external voltage reducing and increasing apparatus to supply power for a cage illumination system and a driving motor of a power-driven cage curtain door.

2. The cage energy supply system according to claim 1, wherein a distance from a plane of rotation of the blade to the bottom of the cage box is a feature distance L, the distance range of the feature distance L is [0.6 m, 1.0 m].

3. A control method of the cage energy supply system according to claim 1, wherein the control method of the energy supply system is as follows:
    (1) when the wind power generation devices and the control system are in an operating state that the first storage battery is charged and the second storage battery supplies power, the MOS switching circuit (IA) is in a turn-on state, the MOS switching circuit (IB) is in a cutoff state, meanwhile, the MOS switching circuit (OB) is in a turn-on state, the MOS switching circuit (OA) is in a cutoff state; instead, the turn-on and cutoff states of each MOS switching circuit are opposite;
    (2) the input end of the current sampling circuit samples a charging current of the storage battery A at intervals of set value time t1; the sampled current signal is converted into a voltage signal through the current-to-voltage converter and is transmitted to the main controller for analysis and judgment; the voltage signal is compared with a set value U that is a converted voltage value corresponding to a current value when the storage battery is saturated;
    (3) if the voltage value is less than the set value, the storage battery is saturated with charging, the main controller enters an interruption and carries out timekeeping to send signals to the MOS switching circuits such that the MOS switching circuit (OA) turns on, the MOS switching circuit (IB) turns on, the MOS switching circuit (IA) is cutoff, meanwhile, timekeeping is started, and the timekeeping is a certain set value time t2, in order not to affect the normal operation of the power device for the cage due to the conversion between turn-on and cutoff states of the MOS switching circuit; after reaching the timekeeping time, the main controller sends a signal to enable a cutoff of the MOS switching circuit (OB).

\* \* \* \* \*